United States Patent [19]

Kiteley

[11] Patent Number: 4,621,313
[45] Date of Patent: Nov. 4, 1986

[54] SOFT-START CAPACITOR DISCHARGE CIRCUIT

[75] Inventor: Kenneth J. Kiteley, Hoffman Estates, Ill.

[73] Assignee: Zenith Electronics Corporation, Glenview, Ill.

[21] Appl. No.: 750,350

[22] Filed: Jun. 28, 1985

[51] Int. Cl.$^4$ ............................................. H02H 7/122
[52] U.S. Cl. ...................................... 363/49; 363/56; 323/901; 323/908
[58] Field of Search ............................ 363/49, 56, 97; 323/901, 908; 320/1; 307/109, 110; 361/18, 87, 111

[56] References Cited

U.S. PATENT DOCUMENTS

| | | | |
|---|---|---|---|
| 4,207,516 | 6/1980 | Babcock | 323/9 |
| 4,315,304 | 2/1982 | Marez et al. | 363/49 |
| 4,473,759 | 9/1984 | Mahabadi | 307/350 |
| 4,494,064 | 1/1985 | Harkness | 323/908 |

Primary Examiner—Peter S. Wong
Assistant Examiner—Judson H. Jones

[57] ABSTRACT

In a switched mode power supply during start-up, an increasing charge on a soft-start capacitor controls a pulse width modulator for increasing the length of drive pulses provided to a pair of switching transistors until a reference voltage level is reached, after which stable power supply operation ensues. Detection circuitry senses a low power supply output voltage such as arising from input line interruptions and rapidly discharges the soft-start capacitor and prevents the recurrence of the soft-start mode of operation before the soft-start capacitor is fully discharged to prevent overloading of power supply output semiconductor devices upon the resumption of normal input voltage to the power supply.

13 Claims, 1 Drawing Figure

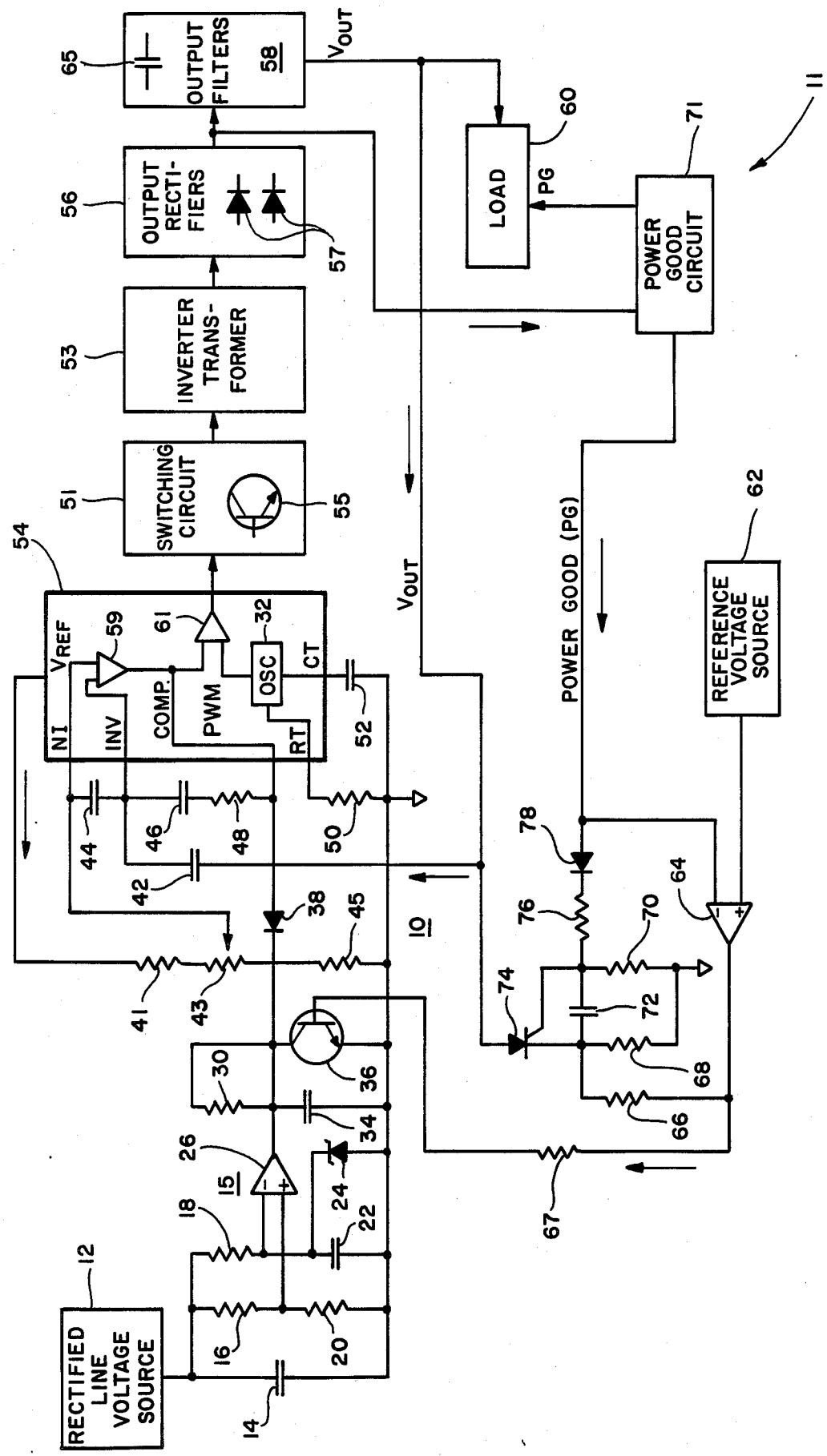

SOFT-START CAPACITOR DISCHARGE CIRCUIT

BACKGROUND OF THE INVENTION

This invention relates generally to switched mode power supplies and is particularly directed to a protection circuit for a switched mode power supply subject to damage arising from line voltage transients.

Switched mode power supplies typically include the series arrangement of an inductance and bi-directional controllable switch means coupled to input terminals for receiving an input voltage, a tuning capacitor arranged in parallel with the inductance, a drive or control circuit providing switching pulses for driving the switch alternately into the conducting and the cut-off states, wherein the duration of the conducting state of the switch is a function of the output voltage, and a rectifier for providing a DC output voltage.

Switched mode power supplies are generally of the tuned or non-tuned type. In a tuned switched mode power supply, a substantially sinusoidal oscillation of large amplitude is provided across the inductance during the time interval in which the switch is cut off, with the frequency of oscillation determined by the value of the inductance and an associated capacitance. After completion of half a cycle of this oscillation, the switch conducts again causing the energy to be fed back to the input voltage. In a non-tuned switched mode power supply, the input voltage is kept substantially constant because the duration of conduction of the switch is controlled as a function of the output voltage. This is usually accomplished by means of pulse duration modulation of the drive pulses applied to the switch, with these pulses having a frequency which is either constant or which varies with changes in the output voltage. Operation of the switching transistor is frequently controlled by an oscillator, where the duty cycle of the oscillator is variable. A control circuit typically senses the output voltage across the load and compares it to an internal reference.

Start-up of these switched mode power supplies is frequently characterized by a "soft" start mode of operation. This allows the power supply to start from zero current and/or zero voltage over a stated period of time during start-up to prevent voltage overshoots and large peak currents. Excessive voltages and peak currents arise from the instantaneous mode of operation of the circuit components during power supply turn-on as well as from line voltage interruptions. These fluctuations occur within the various circuits of the power supply until it achieves a stabilized operating condition. While this transient period may exist only for durations measured in milliseconds, the existing transients may be of substantial size and put excessive stress upon various circuit components. In particular, components such as transistors, integrated circuits and diodes in the output portions of the power supply are highly susceptible to damage arising from fluctuations in power supply operation caused by line voltage interruptions.

Various approaches are taught in the prior art for protecting a system energized by a power supply from variations in its operation such as arising from line voltage transients. For example, U.S. Pat. No. 4,261,032 to Cavigelli discloses a high voltage supply for driving a cathode ray tube which includes a feedback coil which operates to render nonconducting a switching transistor when the current in the feedback circuit reaches a predetermined level corresponding to the saturation of the transistor switch. With the transistor switch thus rendered nonconductive, subsequent large currents therethrough which might damage the power supply as well as the cathode ray tube are prevented. U.S. Pat. No. 4,473,759 to Mahabadi discloses a power sensing circuit which responds to changes in applied circuit voltages such that subsequent circuitry is powered down when the applied supply voltage drops below a specified level and which also incorporates a predetermined delay for powering up the subsequent circuitry when the applied voltage rises back to the same specified level. U.S. Pat. No. 4,207,516 to Babcock discloses a switching regulator circuit for regulating an input voltage which includes a capacitor coupled to a control circuit and responsive to the input voltage for providing a bias signal to delay the switching signal in preventing regulator switch closure during the peak magnitude of the AC input voltage component for limiting the peak current in the regulator circuit. While providing protection for the power supply and systems energized thereby, these approaches are overly complicated and are not intended to provide power supply protection for line voltage interrupts of short duration. Still other approaches make use of series impedances such as a resistor or a thermistor or an inductor, but these solutions are either inefficient or expensive, or both.

The present invention is intended to provide a switched mode power supply protection capability from line voltage interruptions not heretofore available which makes use of the power supply's soft start mode of operation and components associated therewith to reactivate soft-start circuitry before re-application of a full line voltage to the power supply to prevent power supply output component damage arising from excessive currents therein.

OBJECTS OF THE INVENTION

Accordingly, it is an object of the present invention to provide protection against line voltage interrupts in a switched mode power supply.

It is another object of the present invention to detect a low voltage output from a switched mode power supply and to rapidly reactivate its soft-start circuitry to avoid power supply damage arising from line voltage interrupts.

Still another object of the present invention is to detect input voltage variations to a power supply characterized by a soft-start mode of operation for rapidly discharging its soft-start circuitry and preventing damage to various power supply output components when normal input voltage is restored.

BRIEF DESCRIPTION OF THE DRAWING

The appended claims set forth those novel features which characterize the invention. However, the invention itself, as well as further objects and advantages thereof, will best be understood by reference to the following detailed description of a preferred embodiment taken in conjunction with the accompanying drawing which is a simplified combined schematic and block diagram of a soft-start capacitor discharge circuit for use in a switched mode power supply in accordance with the principles of the present invention.

DETAILED DESCRIPTION OF THE PREFERRED EMBODIMENT

Referring to the FIGURE, there is shown in combined simplified schematic and block diagram form a soft-start capacitor discharge circuit 10 for use in a switched mode power supply 11 in accordance with the principles of the present invention.

A rectified line voltage source 12 provides a DC voltage to the soft-start capacitor discharge circuit 10. The rectified line voltage source 12 may be conventional in configuration and operation, typically including a rectifying bridge circuit as well as a biasing transformer for isolation (not shown) in the switched mode power supply 11. The DC output voltage from the rectified line voltage source 12 is provided to a soft-start circuit 15 comprised of resistors 16, 18 and 20, Zener diode 24, capacitors 22 and 34, diode 38, and a comparator 26. This soft-start circuit limits the initial or peak current in the switched mode power supply 11 upon turn-on and thus prevents excessive currents from flowing in various components within the power supply. In the present example, the switched mode power supply 11 is shown coupled to and energizing a conventional microcomputer or microprocessor 60, although such switched mode power supplies as well as the soft-start capacitor discharge circuit 10 of the present invention may be used for driving virtually any electronic device requiring one or more DC voltages for the energization thereof.

The rectified line voltage source 12 provides a reference voltage via resistor 18, capacitor 22 and Zener diode 24 to the inverting input terminal of the comparator 26. In a preferred embodiment, this reference voltage is 2.7 VDC. The output of the isolated rectified line voltage source 12 is also coupled via filter capacitor 14 and a voltage divider network comprised of resistors 16 and 20 to the noninverting input terminal of comparator 26. As the rectified line voltage source output increases to a value greater than the reference voltage applied to the inverting input terminal of the comparator 26, i.e., 2.7 VDC, the comparator provides an output via resistor 30 for charging a soft-start capacitor 34. As the output from the comparator 26 increases, the charge on the soft-start capacitor 34 similarly increases resulting finally in the reverse biasing of diode 38. The anode of diode 38 is coupled to the comparator (COMP) pin of a pulse width modulator 54.

The pulse width modulator 54 in a preferred embodiment is the LM3524 switching regulator control integrated circuit. The pulse width modulator 54 includes an internal reference supply voltage ($V_{REF}$) which is an output from the pulse width modulator from its supply voltage output pin and is provided via a voltage divider network comprised of resistors 41, 43 and 45 to the noninverting (NI) input pin of the pulse width modulator 54. Resistor 43 is of the variable type to permit the reference voltage value provided to the NI input pin of the pulse width modulator 54 to be adjusted as desired, with a reference voltage fed back through the pulse width modulator's NI input pin in a preferred embodiment. The pulse width modulator 54 also includes an inverting (INV) input pin to which is fed back an output voltage from the power supply's output filters 58. Capacitors 42 and 46 in combination with resistor 48 provide frequency compensation for proper roll-off and phase margin of the output voltage of the internal error amplifier 59 of the PWM. Capacitor 44 provides noise decoupling between the NI and INV input pins of the pulse width modulator 54.

The pulse width modulator 54 includes an error amplifier 59 whose noninverting and inverting inputs are respectively supplied with the divided down $V_{REF}$ reference voltage and the fed back output voltage from the power supply's output filters 58. This signal feedback arrangement provides for regulation of the output voltage, compensates for poles and zeros in the network, and prevents unwanted circuit oscillating states as well as instabilities. The output of the error amplifier 59 is, in turn, fed back to the anode of diode 38 and is also provided to one input of a comparator 61 within the pulse width modulator 54. To the other input of the comparator 61 is provided a sawtooth waveform from an oscillator 32 within the pulse width modulator 54. The oscillator 32 is coupled via the RT and CT input terminals of the pulse width modulator 54 to an RC network comprised of resistor 50 and capacitor 52. The comparator 61 compares the output from the error amplifier 59 with the sawtooth output of the oscillator 32 and provides a square wave output to a switching circuit 51. The maximum duty cycle of the square wave output from the pulse width modulator 54 is determined by the charge voltage on the soft-start capacitor 34.

Prior to application of the output of the rectified line voltage source 12 to the soft start circuit 15, there is no charge on capacitor 34 and diode 38 is conducting. With diode 38 rendered conductive upon the charging of capacitor 34, the COMP input pin of the pulse width modulator 54 is pulled low causing the pulse width modulator to operate at a minimum duty cycle. A minimum duty cycle of operation of the pulse width modulator 54 results in the providing of drive signals of short pulse width to the switching circuit 51 which typically includes a plurality of switching transistors 55. As the various transistors 55 within the switching circuit 51 are rendered conductive in response to the pulsed out from the pulse width modulator 54, the output of an inverter transformer 53 coupled to and energized by an output signal from the switching circuit 51 is rectified by a plurality of output rectifiers 56 which include various diodes 57. The DC output of the output rectifiers 56 is provided to various output filters 58 which include output capacitors 65 which are slowly charged by the low duty cycle output of the pulse width modulator 54. When the DC output of the rectified line voltage source 12 provided to the positive input terminal of the comparator 26 becomes greater than the reference voltage level provided to its negative input terminal, capacitor 34 starts charging and finally reverse biases diode 38 rendering it nonconductive. With the output of error amplifier 59 no longer shunted with the lower impedance capacitor 34 via the COMP input pin of the pulse width modulator 54, the output of error amplifier 59 is free to go high and subsequently the duty cycle is free to go high allowing the power supply to be up and running. This procedure involving the slow charging of the various output capacitors 65 in the output filters 58 by means of the slow charging of the capacitor 38 in gradually increasing the duty cycle of the pulse width modulator 54 is known as the "soft", or "slow"-, starting mode of operation of the switched mode power supply 11.

The switching circuit 51 typically includes a plurality of switching transistors 55 which are alternately rendered conductive for providing a pulsed output to an inverter transformer 53. The inverter transformer 53 is, in turn, coupled to output rectifiers 56 which typically include a plurality of diodes 57. The DC output voltage from the output rectifiers 56 is typically filtered by a plurality of output filters 58 and is then provided to a load 60 for initiating and sustaining the operation thereof. The load 60 may be any conventional electronic device powered by one or a plurality of DC voltages such as a microprocessor, a microcomputer, a video display device or various signal processing devices.

The output rectifiers 56 and output filters 58 are generally referred to as the output stages of the switched mode power supply 11. The soft-start capacitor discharge circuit 10 of the present invention provides protection against over stressing by the application of excessive initial or peak currents in the diodes 57 within the output stage of the switched mode power supply 11. A power good circuit 71 is coupled to the output rectifiers 56 and is responsive to the output thereof which corresponds to the line voltage for generating a POWER GOOD (PG) signal. By rapidly discharging the soft-start capacitor 34 upon the detection of a low PG signal from the switched mode power supply and by maintaining the soft-start capacitor in a fully discharged state prior to re-application of a DC voltage from the line voltage source 12, the various electronic components within the power supply's output stages are protected from excessive currents flowing therein. These large currents in the output stages of the power supply arise primarily from the initially uncharged state of the output filter capacitors 58. The manner in which this is accomplished is described in detail in the following paragraphs.

The output voltage from the output filters 58 is not only provided to the load 60, but is also provided to the anode of a silicon controlled rectifier (SCR), or thyristor, 74. The SCR 74 functions as a normal rectifier in "blocking" the power supply's output voltage in the forward direction until a small signal is applied to its control (gate) electrode. Also fed back from the output stages of the switched mode power supply 11 is the PG signal via the power good circuit 71 from the output rectifiers 56. The power good circuit 71 peak detects the output of the output rectifiers 56 and compares this DC voltage with a reference voltage level and provides a 5 VDC logic level as the PG signal when the power supply is up and running. The state of the PG signal reflects the status of the line voltage applied to the switched mode power supply. For example, during normal operation the PG signal is HIGH, while the PG signal is LOW when the line voltage from the power supply drops below a given threshold such as due to a line voltage interruption from the rectified line voltage source 12. The PG signal is provided to the inverting input of a comparator 64, while to the noninverting input thereof is provided a reference voltage from a reference voltage source 62. The PG signal may also be provided to the load 60 where the load includes a memory device (not shown) to provide a preliminary indication of a low voltage condition. In response to a low PG signal, the load 60 would take the necessary steps to prevent data from being lost such as storing it in memory.

In a preferred embodiment, a +4 VDC reference voltage is provided to the noninverting input of the comparator 64 from the reference voltage source. With a low PG signal provided to the inverting input of the comparator 64, its output should be high, but is not because there is no pull-up voltage applied to its output pin. Following the application of a line voltage to the rectified line voltage source 12 and the charging of soft-start capacitor 34, the PG signal goes high and forward biases diode 78. With diode 78 thus rendered conductive by the 5 VDC PG signal, a turn-on current is provided via resistor 76 to the gate electrode of the SCR 74. With SCR 74 thus rendered conductive, a pull-up voltage is applied across resistor 66 to the output pin of the comparator 64. Thus, the output of the comparator 64 should go high, but does not because the PG signal is also provided to its inverting input in preventing the output therefrom from going high. Thus, the output of the comparator 64 remains low during the turn-on of the power supply and once it achieves steady state operation.

With the output of the comparator 64 provided to the base of NPN transistor 36, this transistor will remain nonconductive during the start-up and normal operating states of the switched mode power supply 11. Diode 78 performs a blocking function to prevent the $V_{OUT}$ output voltage from the output filters 58 from being provided to the PG line when the SCR 74 is rendered conductive. Resistor 76 provides a gate current for the SCR 74 from the PG signal, while resistor 68 provides current limiting for the SCR 74 to turn on. Resistor 70 serves as a gate load resistor for the SCR 74, while capacitor 72 provides noise filtering to prevent false triggering of the SCR. As indicated above, resistor 66 serves as a pull-up resistor for the output of the comparator 64, while resistor 67 provides base current for transistor 36.

As thus far described, the output of the comparator 64 thus remains low as the PG signal goes high indicating stable power supply operation. If the PG signal goes below the 4 VDC reference input voltage provided to the comparator 64, the SCR 74 remains conducting and, by means of pull-up resistor 66, the output of the comparator 64 transitions to a HIGH state. A line voltage interruption typically resulting in a reduction in the line voltage of the rectified line voltage source 12 is one common source for a low PG signal causing a high output from the comparator 64 to the base of NPN transistor 36. The high output from the comparator 64 to the base of the NPN transistor 36 renders this grounded transistor conducting resulting in the discharge of the soft-start capacitor 34 to ground potential via transistor 36. With the soft-start capacitor 34 no longer charged, the pulse width modulator 54 ceases providing a square wave output to the switching circuit 51 and operation of the switched mode power supply 11 is terminated. So long as the PG signal is a low logic level, the output of comparator 64 will remain high, NPN transistor 36 will continue conducting, and the soft-start capacitor 34 will remain in a fully discharged state. After capacitor 14 is sufficiently discharged to cause the positive input of comparator 26 to go low, capacitor 34 cannot charge until the line voltage comes back up. This ensures that the switched mode power supply 11 is down when the PG signal goes to a low logic level and cannot restart until the output of the rectified line voltage source 12 is sufficient to cause the noninverting input of the comparator 26 to exceed the 2.7 VDC reference voltage provided to the inverting input of this comparator. Once the divided down output voltage of the rectified line voltage source 12 exceeds the reference voltage applied to the comparator 26, the output of this comparator goes high, initiating the recharging of the soft-start capacitor 34.

There has thus been shoWn a soft-start capacitor discharge circuit for use in a switched mode power supply which continuously monitors the line voltage of the power supply and provides for the rapid discharge of the soft-start capacitor when the line voltage goes below a predetermined threshold such as in response to line interruptions. The soft-start capacitor remains in a discharged state until the rectified line voltage is restored and exceeds a given voltage value whereupon the soft-start capacitor is again recharged for initiating the "soft" start of the power supply in protecting various components in the output stages of the power supply from overstressing by excessive currents flowing therein. The soft-start capacitor discharge circuit of the present invention thus serves to protect not only the switched mode power supply, but also any electronic device coupled to and energized by the switched mode power supply.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a switched mode power supply responsive to a rectified line voltage for providing a DC output voltage and characterized by a soft-start mode of operation for limiting the current in circuit elements in an output stage of the power supply, a soft-start protection circuit comprising:

first comparison means for comparing the rectified line voltage to a first reference voltage and for providing a first signal when the rectified line voltage equals said first reference voltage;

charge storage means coupled to said first comparison means for storing an increasing electrical charge in response to receipt of said first signal;

signal generating means having a variable duty cycle coupled to the output stage and to said charge storage means and responsive to the electrical charge thereon for providing drive signals to the output stage in generating the output voltage therein;

second comparison means coupled to the output stage for comparing the output voltage to a second reference voltage and for generating a shutdown signal when the output voltage is less than said second reference voltage; and conducting means coupled to said second comparison means and to said charge storage means and responsive to said shutdown signal for discharging said charge storage means when the output voltage is less than said second reference voltage, said conducting means further coupled to said first comparison means and responsive to said first signal for terminating the discharging of said charge storage means when the rectified line voltage equals said first reference voltage.

2. The soft-start protection circuit of claim 1 wherein said first comparison means includes in combination a reference voltage source coupled to a comparator, wherein said comparator provides said first signal to said charge storage means when the rectified line voltage equals said first reference voltage generated by said reference voltage source.

3. The soft-start protection circuit of claim 2 wherein said reference voltage source includes a Zener diode.

4. The soft-start protection circuit of claim 1 wherein said charge storage means comprises a grounded capacitor.

5. The soft-start protection circuit of claim 1 wherein said signal generating means includes a pulse width modulator and wherein the duty cycle of said pulse width modulator increases with increasing charge stored in said charge storage means.

6. The soft-start protection circuit of claim 5 wherein the output voltage is provided to said signal generating means for comparison with a third reference voltage therein and wherein the duty cycle of said pulse width modulator varies in accordance with said comparison for regulating the output voltage.

7. The soft-start protection circuit of claim 1 wherein the circuit elements in the output stage include at least one diode, with said soft-start protection circuit limiting the current therein.

8. The soft-start protection circuit of claim 1 wherein said second comparison means includes latch means and a comparator responsive to the output voltage and wherein said latch means maintains said comparator in a conducting state so long as the output voltage is less than the second reference voltage in generating said shutdown signal.

9. The soft-start protection circuit of claim 8 wherein said latch means includes a silicon controlled rectifier and said second comparison means further includes a reference voltage source coupled to said comparator for providing said second reference voltage thereto.

10. The soft-start protection circuit of claim 1 wherein said conducting means includes a grounded transistor for directing the charge on said charge storage means to neutral ground potential when the output voltage is less than said second reference voltage and for terminating the discharging of said charge storage means when the rectified line voltage equals said first reference voltage.

11. The soft-start protection circuit of claim 10 wherein said shutdown signal is provided to a base electrode of said grounded transistor in controlling the charging and discharging of said charge storage means.

12. The soft-start protection circuit of claim 1 wherein the output stage includes at least one capacitor and wherein the charging of said at least one capacitor causes a large current through the circuit elements in the output stage following initial application of the rectified line voltage to the switched mode power supply.

13. The soft-start protection circuit of claim 12 wherein the circuit elements include at least one diode subject to damage arising from a large current flowing therein following initial application of the rectified line voltage to the switched mode power supply.

* * * * *